March 29, 1938. E. RYDER 2,112,307
BREATHER CONTROL DEVICE
Filed Aug. 1, 1935
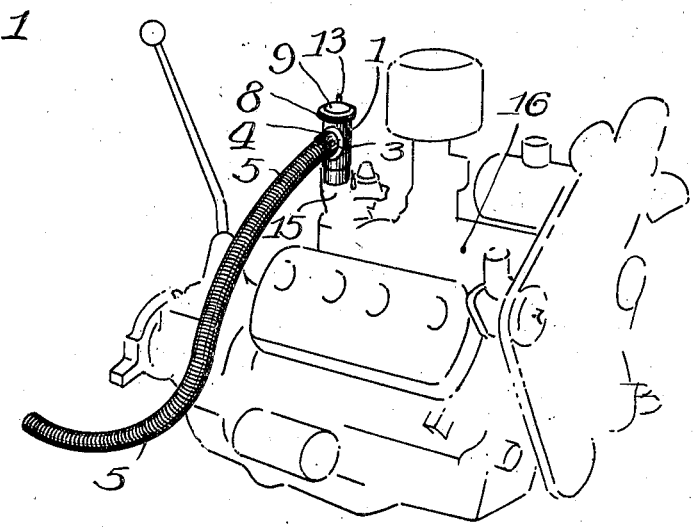
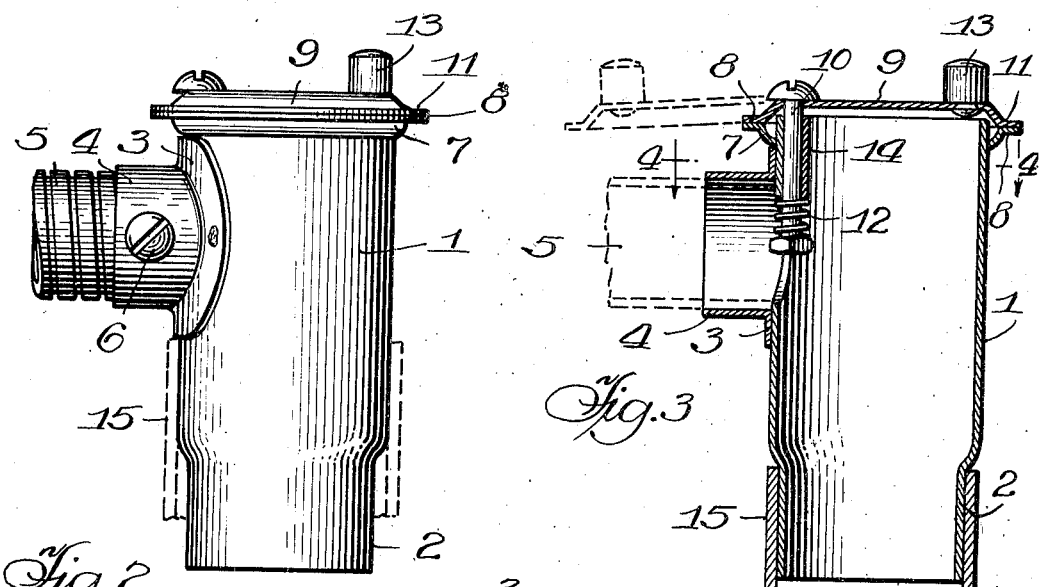
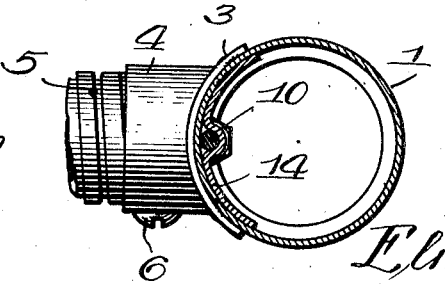
Inventor,
Elmer Ryder Patented Mar. 29, 1938

2,112,307

UNITED STATES PATENT OFFICE 2,112,307

BREATHER CONTROL DEVICE

Elmer Ryder, Elgin, Ill.

Application August 1, 1935, Serial No. 34,243

1 Claim. (Cl. 121—194)

This invention relates to a breather control device of such construction that it can be instantly attached to automobiles or the like.

Among the objects of my invention is to provide a breather control device which will carry away objectionable gases from the motor from the vicinity of the breather outlet and oil intake, and to discharge the same at a point remote from such opening.

Another object is to provide a pipe of varied circumference to fit into one of many different sized motor oil filler openings or breather pipe openings.

Another object is to provide a tight fitting lid which may be opened readily for the insertion of oil to the motor crank case, but which can be turned on its axis to tightly close the opening in the vicinity of the oil intake.

Still another object is to provide a flexible pipe to carry the gases and fumes from the motor to a distant point.

Another object is to provide the type of flexible pipe so that the motor can move independently from the frame without throwing the breather pipe out of line.

A further object is to provide an annular shoulder to catch dirt and spilled oil, and act as a seal to make a tight fit between the lid and body portion.

Another object is to provide a device that may be instantly removed and which may, without adjustment, be adapted to fit into the different sized openings of breather pipes and oil intakes on different models of automobiles.

Other objects, advantages and capabilities are comprehended by the invention as will later appear and as are inherently possessed by the invention.

In the drawing:

Fig. 1 is an outline perspective view of an engine with the breather control device attached.

Fig. 2 is a side elevation of the device showing engagement with one size of breather pipe.

Fig. 3 is a longitudinal sectional view of the device.

Fig. 4 is a transverse section on the line 4—4 of Fig. 3.

Referring in detail to the drawing, my invention comprises a cylindrical body 1, having a reduced circumference as shown at 2. Attached to the upper end of the cylinder and encompassing an opening therein (see Fig. 3) is a fitting having a flange 3 and a cylindrical part 4 into which is mounted an end of a flexible tube 5 secured in place by a set screw 6 mounted in the part 4. The tube 5 is of sufficient length to carry fumes and air remotely from the immediate proximity of the breather.

The upper end of the cylinder 1 is provided with an annular flange 7, the upper portion of which is flattened to provide a flat surface 8 on a plane at right angles to the vertical cylinder 1, and so positioned that the flat surface 8 is slightly below the upper end of the cylinder 1. The cylinder 1 is also provided with a lid 9 normally held in place by a spring actuated stay bolt 10 which operates to maintain the lid when in closed position with its flat flange 11 in close frictional contact with the flat surface 8 of the part 7.

The flange 11 of the lid 9 is of greater diameter than the cylinder 1 and depends below the upper end of the cylinder 1 to provide an annular chamber about the upper end portion of the cylinder 1. When in closed position the lid 9 is forced by the spring 12 into sealing contact with the shoulder 7 and its horizontal flange 8, thus preventing the escape of gas at the upper opening of the cylinder. A knob 13 is attached to the upper side of the lid 9 for easy manipulation of the lid. A reinforcing member 14 is secured inside of the cylinder 1 at the upper end portion thereof and has a passage for slidably carrying the bolt 10. It may be attached to the cylinder wall by riveting or welding or other suitable means.

The bolt 10 which is provided with a screw slot at its upper end and a nut at its lower end may be tightened or loosened by a screw-driver to regulate the frictional engagement between the lid 9 and the flange 7.

As will be understood from the drawing, the breather control device is inserted in the breather pipe 15 of the engine 16.

The breather pipes of various automobile engines have different sized openings, and the cylinder 1 of the device is provided with diameters of various sizes, so that the device will fit in a larger sized breather pipe as shown in Fig. 2, or in a smaller one as shown in Fig. 3, without any change or manipulation of the device or the breather pipe. In the disclosed embodiment but two diameters are shown but it is contemplated to make the cylinder or casing 1 of two or more diameters. When it is desired to insert oil into the crank case, the operator opens the lid 9 by swinging it around the axis of the bolt 10, and at the close of the operation closes the lid 9, thus preventing the escape of gases in the immediate proximity to the breather pipe and compelling it to flow through the interior of the tube 5 to some unobjectionable point or locus remote from the location of the breather pipe. It will thus be seen that the breather control device may be instantly attached to motors having different sized breather pipes, and without interfering with the intake or outlet of air or gases, but removing the point of intake or outlet from the proximity of the breather pipe where escaping gases may be injurious to the occupants of the car, especially in cold weather when the doors and windows of the car are closed. It is thus seen that my breather control device possesses maximum simplicity, is economical to manufacture, possesses great adaptability in installation and in use, and due to its arrangement of parts possesses maximum ease of installation and operation, as well as efficiency.

While I have disclosed an illustrative embodiment of the invention, it is to be understood that it is not limited thereto, but comprehends other constructions, details, arrangement of parts and the like without departing from the spirit of the invention.

Having thus disclosed the invention—

I claim:

A breather control device for an internal combustion engine, comprising a member adapted to be attached to the breather outlet and oil inlet of the engine, said member having a plurality of graduated diameters at the end adapted to be attached to the breather outlet whereby the device may be connected to outlets of varying sizes or diameters, means for carrying away the gases escaping into said member, a flange on the upper outer part of said member and extending slightly below the upper end thereof and a spring controlled cover having a flange adapted to engage said first mentioned flange to close said member, said cover being slidable to permit entry of oil to said outlet.

ELMER RYDER.